(12) United States Patent
Narbutt

(10) Patent No.: US 9,380,100 B2
(45) Date of Patent: Jun. 28, 2016

(54) REAL-TIME VOIP TRANSMISSION QUALITY PREDICTOR AND QUALITY-DRIVEN DE-JITTER BUFFER

(75) Inventor: Miroslaw Andrzej Narbutt, Lodz (PL)

(73) Assignee: DUBLIN INSTITUTE OF TECHNOLOGY, Dublin (IE)

( * ) Notice: Subject to any disclaimer, the term of this patent is extended or adjusted under 35 U.S.C. 154(b) by 661 days.

(21) Appl. No.: 13/515,745

(22) PCT Filed: Dec. 14, 2010

(86) PCT No.: PCT/EP2010/069677
§ 371 (c)(1),
(2), (4) Date: Aug. 17, 2012

(87) PCT Pub. No.: WO2011/073217
PCT Pub. Date: Jun. 23, 2011

(65) Prior Publication Data
US 2012/0300769 A1 Nov. 29, 2012

(30) Foreign Application Priority Data

Dec. 14, 2009 (GB) .................................. 0921806.6

(51) Int. Cl.
*H04L 29/06* (2006.01)
(52) U.S. Cl.
CPC .............. *H04L 65/608* (2013.01); *H04L 65/80* (2013.01)
(58) Field of Classification Search
CPC ..... H04J 3/06; H04L 12/2493; H04M 1/2535
USPC .............. 370/252, 352, 516; 704/270; 725/11
See application file for complete search history.

(56) References Cited

U.S. PATENT DOCUMENTS 7,796,524 B1 * 9/2010 O'Connell et al. ............ 370/241
7,957,426 B1 * 6/2011 Choudhury et al. .......... 370/516
(Continued)

FOREIGN PATENT DOCUMENTS

| WO | 2008051123 A1 | 5/2008 | |
| WO | WO 2008051123 A1 * | 5/2008 | ................ H04J 3/06 |

OTHER PUBLICATIONS

"Jitter Buffer Analysis", Oklander, Technion—Israel Institute of Technology, IEEE 2008, p. 5, Figs 3 and 4.*
Jitter Buffer Analysis, Oklander, Technion—Israel Institute of Technology, IEEE 2008, p. 5, Figs 3 and 4.*
Fast Channel Changing in RTP, DW Singer, TN01194, Dec. 2006; sections 3.1, 5.1, 6.1.*
(Continued)

*Primary Examiner* — Andrew Lai
*Assistant Examiner* — Chuong M Nguyen
(74) *Attorney, Agent, or Firm* — Nydegger & Associates

(57) ABSTRACT

Voice over Internet Protocol (VoIP) transmission quality predictor working in real-time provides feedback information regarding transmission impairments, transmission quality and end-user satisfaction to quality enhancement mechanisms along the transmission path. Quality enhancement mechanisms use this feedback information in the process of tuning their control parameters. The transmission quality predictor calculates the transmission rating factor R at each of the outputs based on the information regarding voice codec, packet loss, and mouth-to-ear delay. Information regarding voice codec and packet loss is determined from VoIP packet headers. Information regarding mouth-to-ear delay is determined from an additional time stamp that is inserted into each RTP packet header by the VoIP sender. Finally, the play-out delay of received VoIP packets for the actual time window is set equal to the play-out buffer output in the prior time window which gave the highest R-factor value.

12 Claims, 9 Drawing Sheets

(56) References Cited

U.S. PATENT DOCUMENTS

| | | |
|---|---|---|
| 8,121,150 B1 | 2/2012 | Nelson |
| 2004/0199659 A1* | 10/2004 | Ishikawa et al. .............. 709/235 |
| 2005/0058149 A1* | 3/2005 | Howe ............................ 370/428 |
| 2006/0041431 A1* | 2/2006 | Maes ......................... 704/270.1 |
| 2006/0168612 A1* | 7/2006 | Chapman et al. ................ 725/11 |
| 2010/0135171 A1* | 6/2010 | Jung et al. ..................... 370/252 |
| 2011/0075577 A1* | 3/2011 | Chen et al. .................... 370/252 |

OTHER PUBLICATIONS

Singer, Fast Channel Changing in RTP (Draft), Internet Streaming Media Alliance Internal, Dec. 2006, Document No. TN01194.

Definition of Categories of Speech Transmission Quality, Amendment 1: New Appendix I, International Telecommunications Union, Jan. 2007, Cover Sheet through p. 9.

Perkins, Rapid Synchronisation of RTP Flows (Draft), Network Working Group, Mar. 2009, pp. 1 through 17.

\* cited by examiner

Performance of the Ramjee Alg.
(control parameters: α=0.998002, β=4)
MOS=3.9, i.e. mobile quality

Packet & Playout Delays

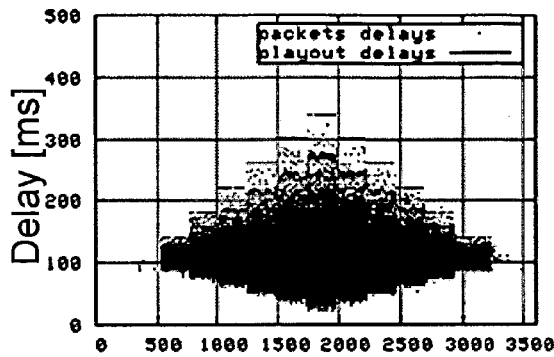

packet delays and playout delays vs time

Buffer Occupancy

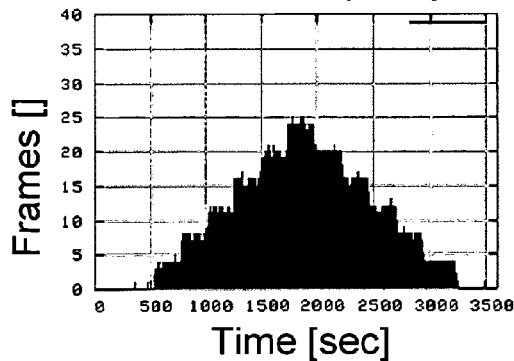

Time [sec]

buffer occupacy vs time

Quality contours for G.711/bursty loss

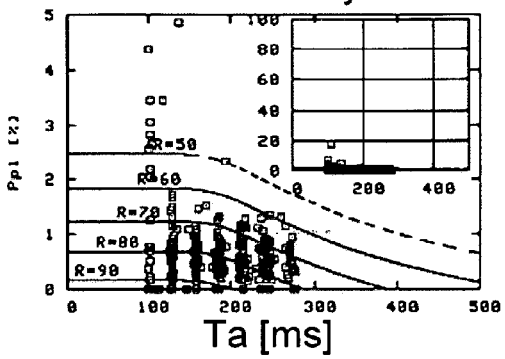

Ta [ms]

Av. playout delays and resulting av. Packet loss on quality contours excellent user satisfaction:
12.5% of the time
av. R=79.3 (MOS=3.9)

user satisfaction

Figure 7

Performance of the Moon Alg.
(control parameters: #samples=1200, desired loss=0.5%)
MOS=3.9, i.e. mobile quality

Packet & Playout Delays

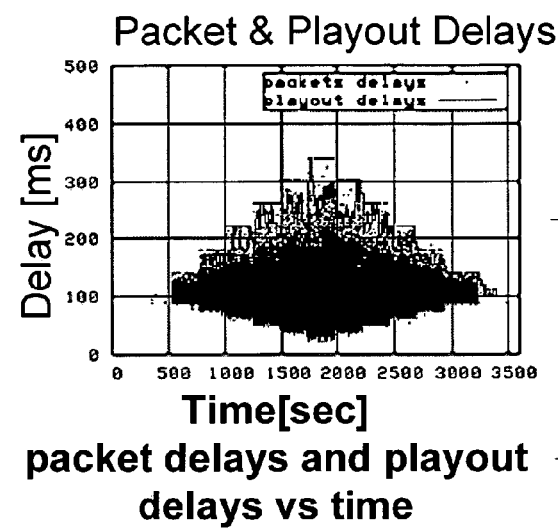

packet delays and playout delays vs time

Quality contours for G.711/bursty loss

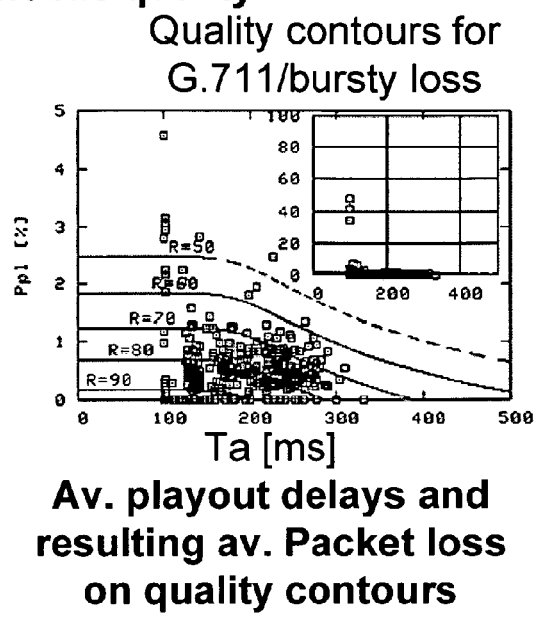

Av. playout delays and resulting av. Packet loss on quality contours

Buffer Occupancy

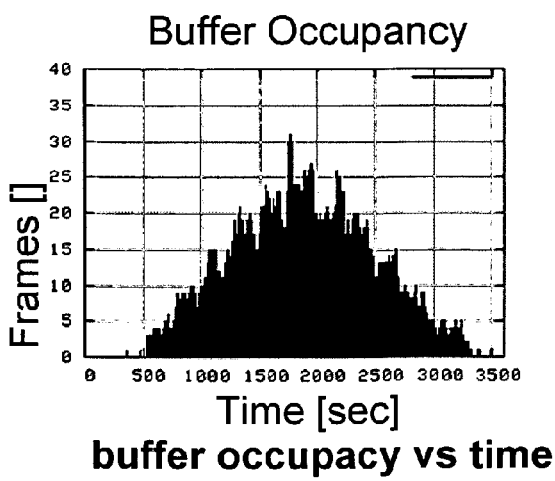

buffer occupacy vs time excellent user satisfaction:
14.4% of the time
av. R=78.9 (MOS=3.9)

user satisfaction

Figure 8

Performance of the quality-driven de-jitter buffer (control parameters: $d_k = 120, 160, \ldots, 360, 400\text{ms}$)

MOS=4.3, i.e. PSTN quality

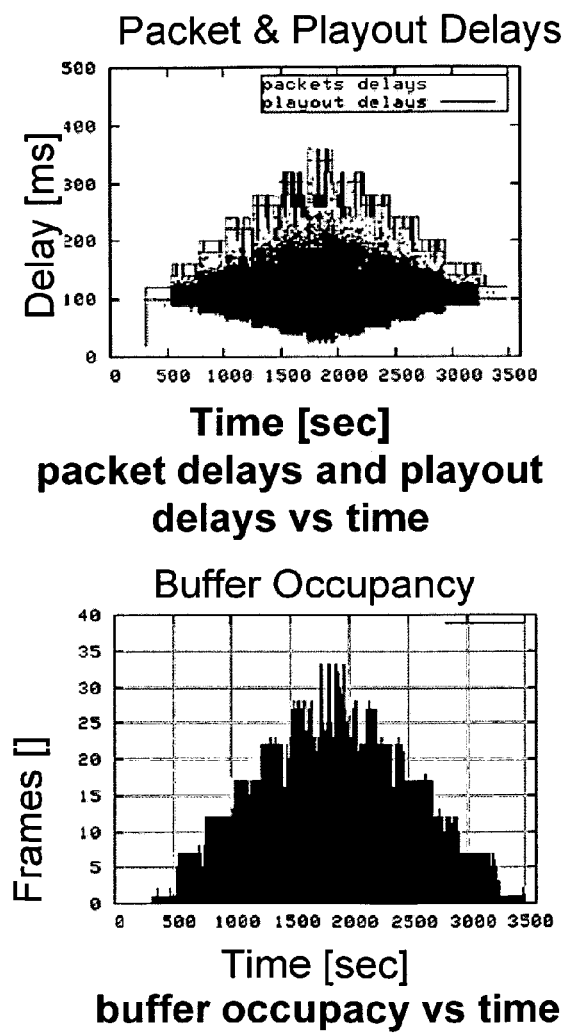
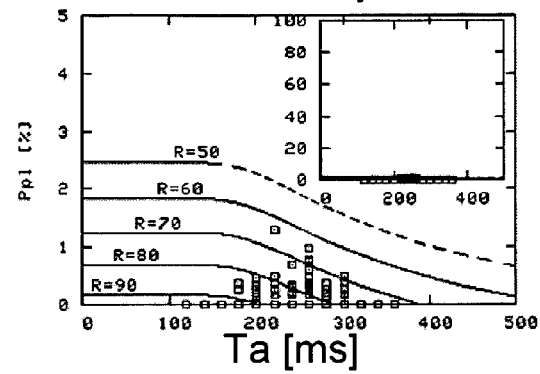

Packet & Playout Delays

Quality contours for G.711/bursty loss packet delays and playout delays vs time

Av. playout delays and resulting av. Packet loss on quality contours

Buffer Occupancy excellent user satisfaction:
46.4% of the time
av. R=87.1 (MOS=4.3)
user satisfaction buffer occupacy vs time

Figure 9

REAL-TIME VOIP TRANSMISSION QUALITY PREDICTOR AND QUALITY-DRIVEN DE-JITTER BUFFER

FIELD OF THE APPLICATION

The present application relates to methods of predicting the subjective quality of voice communication over IP networks (VoIP) in which voice is digitized, compressed, formed into packets, transmitted over a packet network and then re-assembled and decoded by a receiving system and played back to a user. More particularly, the present application relates to predicting and improving to the quality of Voice over Internet Protocol (VoIP).

BACKGROUND

Voice communication over Internet Protocol (VoIP) has experienced rapid growth in recent years. However, the quality of VoIP is usually not as good as is that provided by the traditional Public Switched Telephone Network (PSTN). In fact, VoIP is affected by various transmission impairments that do not appear in PSTN systems. They include: packet delays, packet loss, and packet delay variation (or jitter). It will be appreciated that in order to achieve PSTN-like quality, the impact of these transmission impairments should be minimized.

The quality of VoIP, as perceived by an end-user, is a combined effect of conversation's interactivity and listening speech quality. Large packet delays introduced in IP networks influence a conversation's interactivity. Packet loss impacts on the listening speech quality. Finally, packet delay variation affects both interactivity and speech quality (jitter is processed by means of de-jitter buffering and transformed into either additional de-jitter play-out delay or further late packet loss) [1].

Real-time VoIP transmission imposes stringent requirements on one-way mouth-to-ear delays and packet loss. ITU-T defines these requirements by introducing so called "contours of user satisfaction" that determine speech transmission quality for all possible combinations of packet loss and mouth-to-ear ear delay [2]. The responsibility of meeting these requirements is shared between end-points and the underlying network. As long as transmission impairments remain below a certain level, actions at end terminals can be employed to mitigate their effects. For example:

optimal voice encoding schemes can be used to give smaller bandwidth utilization;
packet loss concealment (PLC) can be implemented to mitigate the effect of packet loss on speech quality;
de-jitter buffering can be implemented to compensate for packet delay variation;
echo cancellation techniques can improve speech intelligibility.

On the network side there is considerable development activity in designing new architectures and protocols. Integrated Services (Int-Serv) mechanisms can provide QoS guarantees by adding circuit-like functionality (with the use of RSVP protocol). Differentiated Services (Diff-Serv) mechanisms enable service differentiation and prioritization of various traffic classes (e.g. prioritizing VoIP traffic over other traffic types)

Application-layer and network-layer mechanisms can greatly mitigate the effect of transmission impairments on VoIP quality. VoIP devices may make use of both of these mechanisms in order to achieve PSTN-like conversational quality. However these quality enhancement mechanisms are often complex and difficult to configure. Moreover, tuning one parameter can often lead to a local performance improvement but can have a disastrous effect on the overall end-to-end VoIP quality. If a part of the VoIP transmission path is being tuned, the impact of local tuning actions on end-to-end VoIP quality (i.e. both interactivity and speech quality) has to be taken into account. An example of such a tuning process is the process of tuning the size of the de-jitter buffer at VoIP terminals.

To compensate for jitter a typical VoIP terminal buffers incoming packets before playing them out. This lets slower packets arrive on time and play out at their sender-generated rate. In theory, the optimal play-out delay for this de-jitter buffer should be equal to the total variable delay along the connection. Unfortunately, it's impossible to find an optimal, fixed de-jitter buffer size when network conditions vary in time. The fluctuating end-to-end network delays may cause play-out delays to increase to a level, which is irritating to end users (when the de-jitter buffer is too large) or may cause packet losses due to their late arrivals (when the de-jitter buffer is too small). A good playout algorithm should be able to keep the buffering delays as short as possible while minimizing the number of packets that arrive too late to be played out. These two conflicting goals have led to various de-jitter buffers with a dynamic size allocation, so called adaptive playout buffers [3], [4], [5], [6], [7], [8].

An adaptive playout buffer makes it possible to balance its buffering delay—a major addition to end-to-end delay—with the possibility of late packet loss. A fundamental trade-off exists between late packet loss and buffering delay as both increased packet loss and increased buffering delay impair the conversational VoIP quality. This loss/delay trade-off leads to an operating point where maximum conversational VoIP quality may be achieved. Typical adaptive playout algorithms are not designed to search for this operating point. Instead, they simply follow network delays closely while attempting to keep both delay and loss low. Given that the purpose of de-jitter buffering is to improve conversational VoIP quality (i.e. both interactivity and speech quality), a more informed choice of the playout mechanism may be made by considering its effect on user satisfaction [9],[10].

SUMMARY

The present applications comes from perspective that whilst quality contours are known which map the loss/delay trade-off on end-user satisfaction [2], they are not employed by the algorithms used within VOIP devices for adjusting buffer delays. Instead they are generally employed for modeling purposes. The present application employs such quality contours in combination with an accurate measure of the mouth-to-ear delay experienced by individual packets A VoIP transmission quality predictor is proposed that may be used to assess user satisfaction and, in addition to that, to control the size of de-jitter buffer.

The application overcomes the difficulties of the prior art in two aspects. Firstly, it provides accurate values of end-to-end packet delays which are necessary to precisely predict the quality of VoIP transmission from time-varying transmission impairments. Secondly, it adapts the size of the de-jitter buffer to changing network conditions by considering its effect on end-user satisfaction.

The application has an absolute clock reference on the transmission side and on the receiving side and includes an absolute timestamp into each VoIP packet that is transmitted. Once received, the absolute timestamp may be extracted and compared with the absolute clock reference on the receiving side to provide an accurate value for the delay of an individual packet. Once packet delay is accurately known, transmission impairments can be precisely calculated for a number of pre-determined play-out buffer outputs. A significant improvement can be obtained in perceived user quality (or user satisfaction) by adjusting the actual play-out delay to the play-out buffer output which gave the highest score regarding VoIP transmission quality.

More particularly, methods and devices are provided in accordance with the claims which follow.

DESCRIPTION OF DRAWINGS

Further features and advantages will become apparent from the detailed description which follows in which:

FIG. 7 represents the results of a prior art algorithm, to FIG. 8 represents the results of a prior art algorithm, and FIG. 9 represents the results of an algorithm of the present algorithm.

DETAILED DESCRIPTION

1. Time Synchronization

Figure 1:
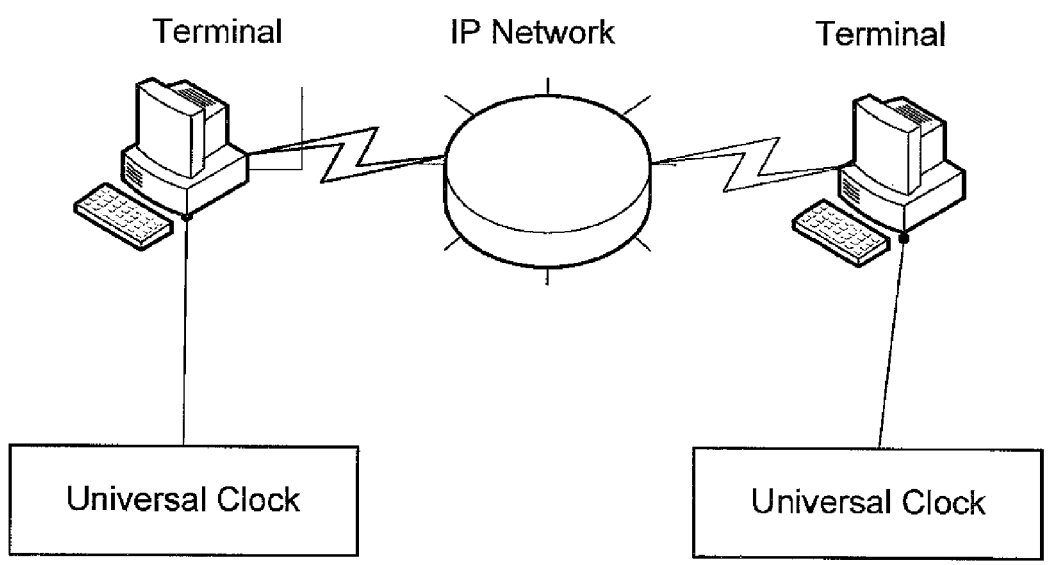
FIG. 1 is an exemplary arrangement for use in the present application.

An exemplary arrangement suitable for implementing the present invention, as shown in FIG. 1, comprises a first VoIP device and a second VoIP device which are connected together by a connecting network. The VoIP device may be a VoIP terminal, for example a PC employing appropriate VoIP software. The VoIP device may also be a gateway between two types of networks (e.g. conversion point for converting an analogue telephone call into a VoIP telephone call). The connecting network may comprise a plurality of interconnected networks including for example the Internet.

In the exemplary arrangement and in contrast to prior art approaches, each VoIP device has their clock synchronised to that of a universal clock. Techniques for synchronising a device to a universal clock would include use of the well known global positioning system (GPS), where GPS receivers in addition to determining their position can also provide an accurate time value reflecting that of the accurate clocks deployed within the satellites. Accordingly, in one embodiment the synchronising of the VoIP device requires a device to be connected to or periodically connected to a GPS receiver. It will be appreciated that it is becoming more common for computing devices to have a GPS receiver built in and that a variety of compact GPS receivers are available for connection as a peripheral where a device does not have one in-built. Other techniques for synchronising to a universal clock, where a GPS or similar signal is not available, would include using Network Time Protocol (NTP) details of which may be found for example at the NTP IETF website [11] or using newer protocols like Hyper Text Transfer Protocol (HTTP) Time Protocol (HTP) [12].

The present application relies upon both devices in the arrangement being synchronised to one and other although it will be appreciated that this may be with reference to another. More particularly, in the exemplary embodiment of the present application it is proposed that this is achieved by both devices being synchronised to a universal clock. The synchronisation may be performed on a periodic basis and need not be performed by both devices.

2. Determining the Absolute End-to-End Delay of a VoIP Packet

Assuming the devices are synchronised, the process begins with each transmitting device including an absolute timestamp in each VoIP or related packet they transmit to another device.

Figure 2:
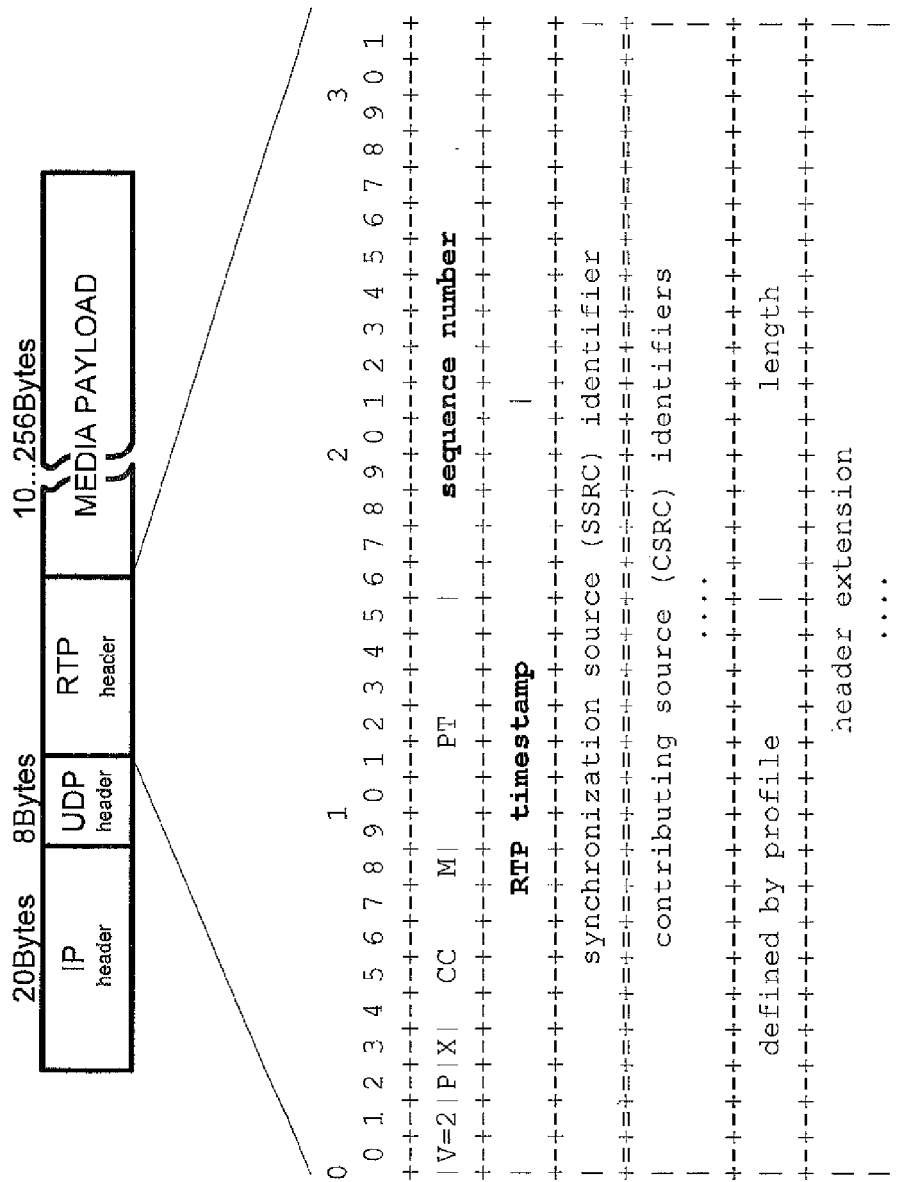
FIG. 2 is a diagram of a conventional VoIP packet known from the prior art.

The reason for this will become apparent from a discussion of existing packet structures which as will be appreciated by those skilled in the art also include a timestamp. In particular, as shown in FIG 2, the structure of a prior art packet which might be a conventional VoIP packet, in which the voice data is encapsulates speech data as the packet payload. Internet Protocol (IP) and User Datagram Protocol (UDP) headers are employed, as would be familiar to those skilled in the art, to ensure the delivery of the packet to the destination. The Real Time Protocol (RTP) header contains information for the receiver necessary to reconstruct the media stream in a timely manner. In particular, the RTP header comprises a sequence number and RTP timestamp . The sequence number is a 16 bit number incremented by one for each VoIP packet sent. This number is used by the receiver to detect packet loss and to restore packet sequence when packets arrive out of order. The initial value of the sequence number is random. The RTP timestamp is a 32 bits number that reflects the time instance when the media payload was generated. The timestamp is incremented monotonically and linearly in time. This time instance is media-specific and as such is determined by the sampling audio device and not by a system clock. Moreover, it will be appreciated by those skilled in the art that the initial value of this timestamp is random. Whilst the primary functions of the sequence number is to arrange packets correctly when reconstructing audio and to account for missing packets, the RTP timestamp is employed to determine timing of playback of the audio. The reason for the RTP timestamp in addition to the sequence number is that packets may not be sent at a constant rate. For example, during a quiet period where a user is not speaking no packet may be transmitted. The RTP timestamp is necessary to ensure an equivalent quiet section at the receiver.

Figure 3:
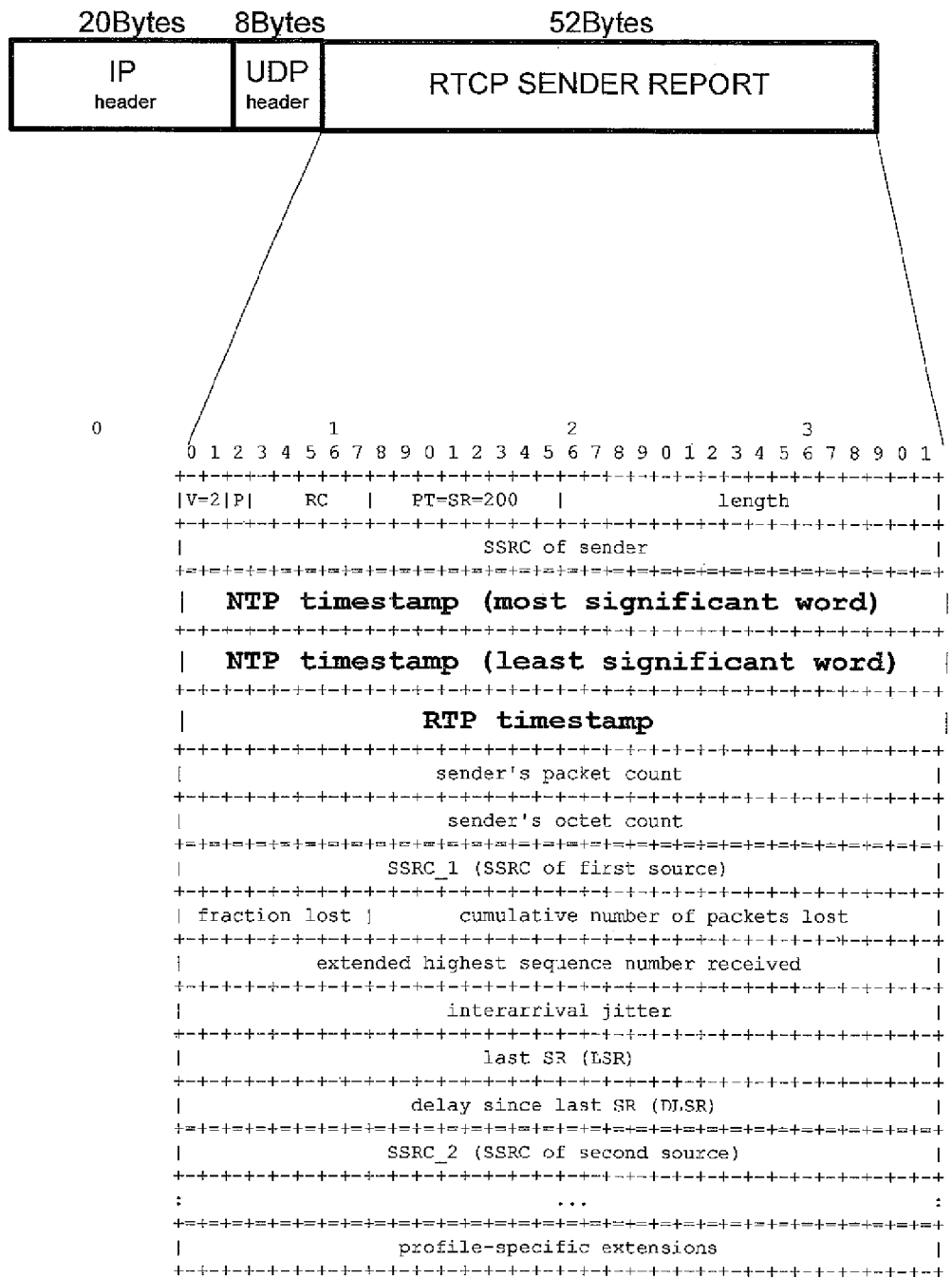
FIG. 3 is a diagram of a conventional control packet used in VoIP from the prior art.

Additionally, VoIP terminals provide reception quality feedback using RTP control packets called Real Time Control Protocol (RTCP) packets. RTP specification defines several control RTCP types to carry a variety of control information. These include SR packets which are sender reports sent from active participants and RR packets which are receiver report containing transmission and reception statistics sent from passive participants. An example of RTCP Sender Report packet (RTCP SR) with emphasis on NTP and RTP timestamps is shown in FIG. 3. The NTP timestamp is a 64 bit number that carries the system time of the time instance when the SR RTCP packet report was sent. The RTP timestamp (32 bits) corresponds to the NTP timestamp (above), but in the same units and with the same random offset as the RTP timestamps in data packets. RTCP packets are periodically transmitted to all participants in a session, using the same transport mechanism (usually UDP transport protocol) as the VoIP packets. The primary function of RTCP is to provide Quality of Service monitoring and congestion control. The sender, for example, may adjust its transmission bit-rate based on the Receiver Report (RR RTCP) feedback. Whilst, the receiver can estimate packets delays based on NTP timestamps in SR RTCP packets and corresponding RTP timestamps in VoIP packets, their use is not ideal.

In particular, a difficulty with using them is that system and audio clocks are not running at exactly the same rate on a given host [17]. Whilst it is possible to compare the relative delay between packets, it is not possible from the existing timestamps to identify the actual delay of any one packet. The effect of this is that algorithms adjusting the buffer size are unsure of the optimum buffering delay to ensure maximum perceived quality in speech received by end-user.

Figure 4:
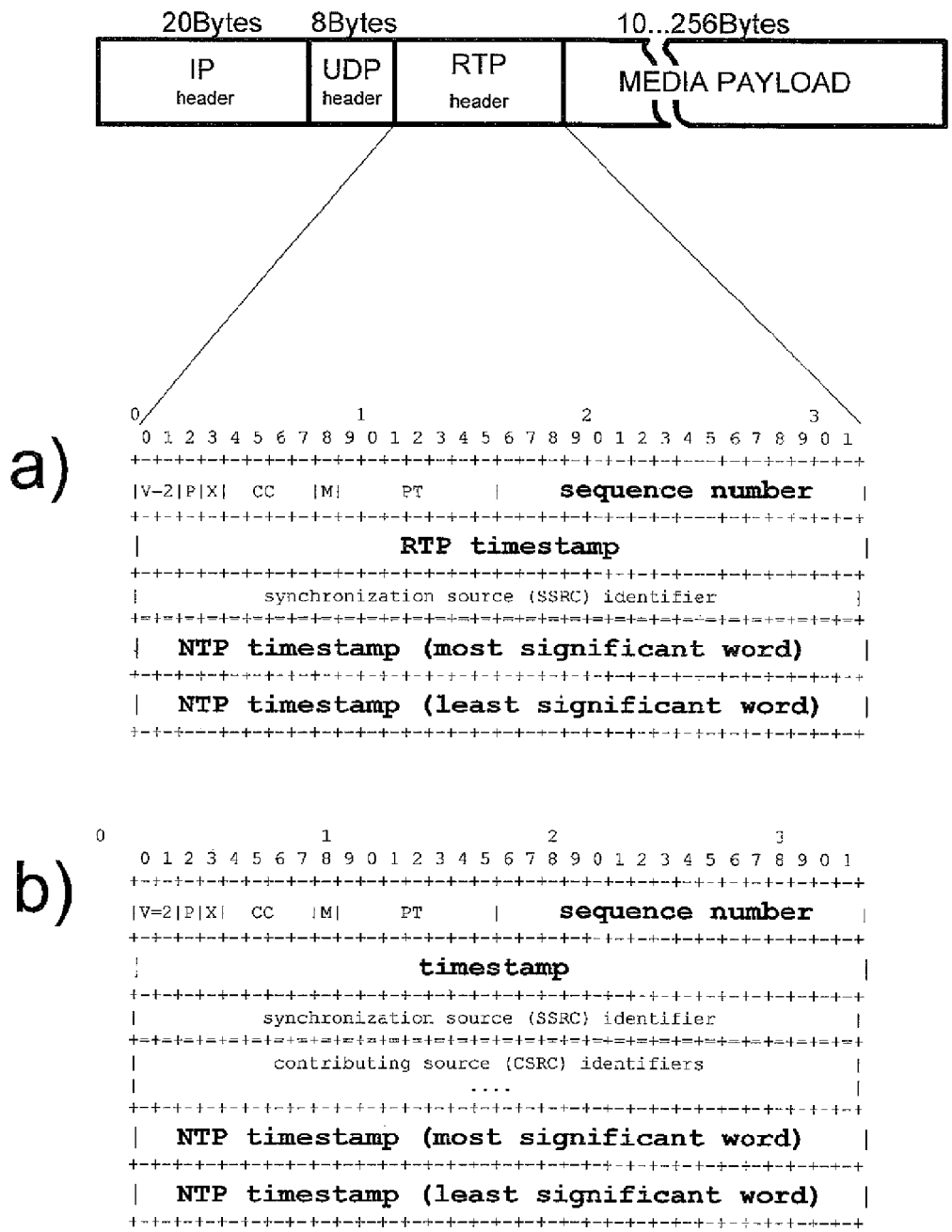
FIG. 4 is a diagram of illustrating the incorporation within a conventional VoIP packet of an NTP timestamp.

In contrast, the present application solves this problem by synchronising the clocks of the transmitting and receiving devices. In the VoIP sending device, the actual generation time (absolute timestamp) of a VoIP packet is converted to a suitable format for embedding into packets, for example the NTP timestamp format (64 bits long), with the first 32 word of the 64 bits representing the number of seconds and the latter 32 bit word representing the modulus of the second. Once converted to a suitable format, the timestamp is embedded within the packet, for example by inclusion as two contributing source (CSRC) fields (32 bits each) of the RTP packet header (as shown on FIG. 4 a) or appended in the optional fields following the CSRC list if present (as shown on FIG. 4 b). It will be appreciated that as the transmitting device and receiving device are synchronised, the receiving device may extract the absolute timestamp from the packet. Once extracted the receiving device may compare the value of the absolute NTP timestamp with the current value of the local clock to provide a time delay value. It will be appreciated that as the local clock is synchronized to a universal clock and hence by equivalence to the transmitting device, it is possible to accurately determine the absolute time delay incurred by a packet in transmission from the transmitting device to the receiving device.

3. VoIP Transmission Quality Predictor

The "actual" end-to-end delay experienced by each packet being transmitted over the network and received at the receiver may be determined from NTP timestamps. In addition to that, by monitoring sequence numbers at the receiving VoIP device it is also possible to determine packet loss probability.

Moreover, once packet delays and packet loss are accurately determinable, it becomes possible to calculate the quality of VoIP transmission (i.e. transmission factor R) for a number of pre-determined play-out buffer outputs.

The transmission rating factor R factor reduced to transmission layer may be calculated as follows:

$$R = R_0 - I_{dd}(T_a) - I_{e\text{-}eff}(P_{pl})$$

where $R_0$ represents the basic signal-to-noise ratio, Delay Impairment $I_{dd}$ represents loss of interactivity and the Effective Equipment Impairment $I_{e\text{-}eff}$ covers information loss due to encoding scheme and packet loss. This function may be viewed as a function of two variables that are already determined: mouth-to-ear delay $T^a$ (i.e. including de-jitter buffering delay) and packet loss probability $P_{pl}$ (i.e. including late packet loss). ITU-T gives a fully analytical to expression for calculating $I_{dd}$ from mouth-to-ear delay $T_a$ [14] and $I_{e\text{-}eff}$ from packet loss probability $P_{pl}$ [15],[16].

The important parameter for the real-time VoIP transmission quality predictor is the time window W of recently received packets, which is used to calculate all quality metrics. ITU-T recommends calculating average playout delays (i.e. is ay. Ta) and average packet loss (i.e. ay. Ppl) over non-overlapping time windows of 10 seconds or for every talkburst. Consequently, all quality metrics (ay. $I_{dd}$, ay. $I_{e\text{-}eff}$ and ay. R) are also calculated over these time windows.

4. Quality-Driven De-Jitter Buffer

VoIP transmission quality predictor can provide quality metrics to quality enhancement mechanisms along the transmission path. Quality enhancement mechanisms can use this feedback information, in the process of tuning their control parameters. An example is quality-driven de-jitter buffer.

VoIP transmission quality R is a function of both mouth-to-ear delay $T^a$ and packet loss Ppl. Choosing a playout delay p at the de-jitter buffer, determines both. In particular, there is only one free control parameter in playout buffering, namely the playout delay p; the loss rate, due to late arrival, is a side-effect of choosing p.

Figure 5:
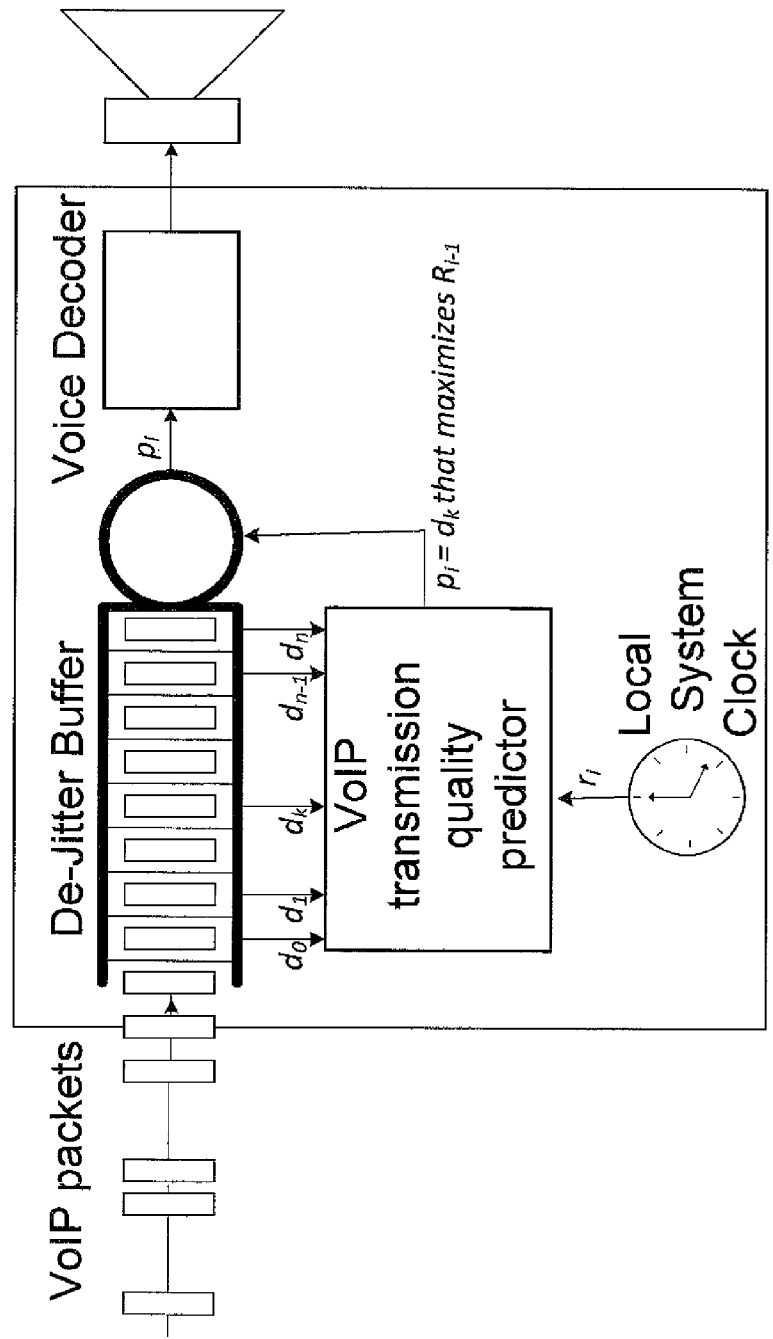
FIG. 5 is a diagram illustrating the operation of a Quality-driven Playout Buffer Mechanism according to an embodiment of the present application.

The quality-driven de-jitter buffer proposed here has a number of outputs, i.e. pre-determined playout deadlines. These pre-determined playout deadlines can be either arbitrary chosen (e.g. $d_0$=100 ms, $d_1$=150 ms, . . . ) or can be calculated by an external playout algorithms (in this case each playout deadline will be calculated either by different algorithms or by one algorithm controlled by different parameter settings). During VoIP transmission, the quality predictor calculates all quality metrics (ay. $I_{dd}$, ay. $I_{e\text{-}eff}$ and ay. R) in the actual time window for each of the pre-determined playout deadlines (i.e. $T_{a0}$=$d_0$, $T_{a1}$=$d_1$, . . . ) . In order to maximize transmission quality R, the actual playout to delay $p_t$ of received VoIP packets for the actual time window is set equal to the playout deadline $d_k$ in the prior time window which gave the highest R-factor value as shown on the diagram in FIG. 5.

The quality-driven de-jitter mechanism is specifically designed to maximize the transmission factor R used for its performance evaluation. In this sense, it is is expected to outperform other schemes when compared using this measure.

5. De-jitter Buffer Performance Evaluations with the Use of Quality Contours

Figure 6:
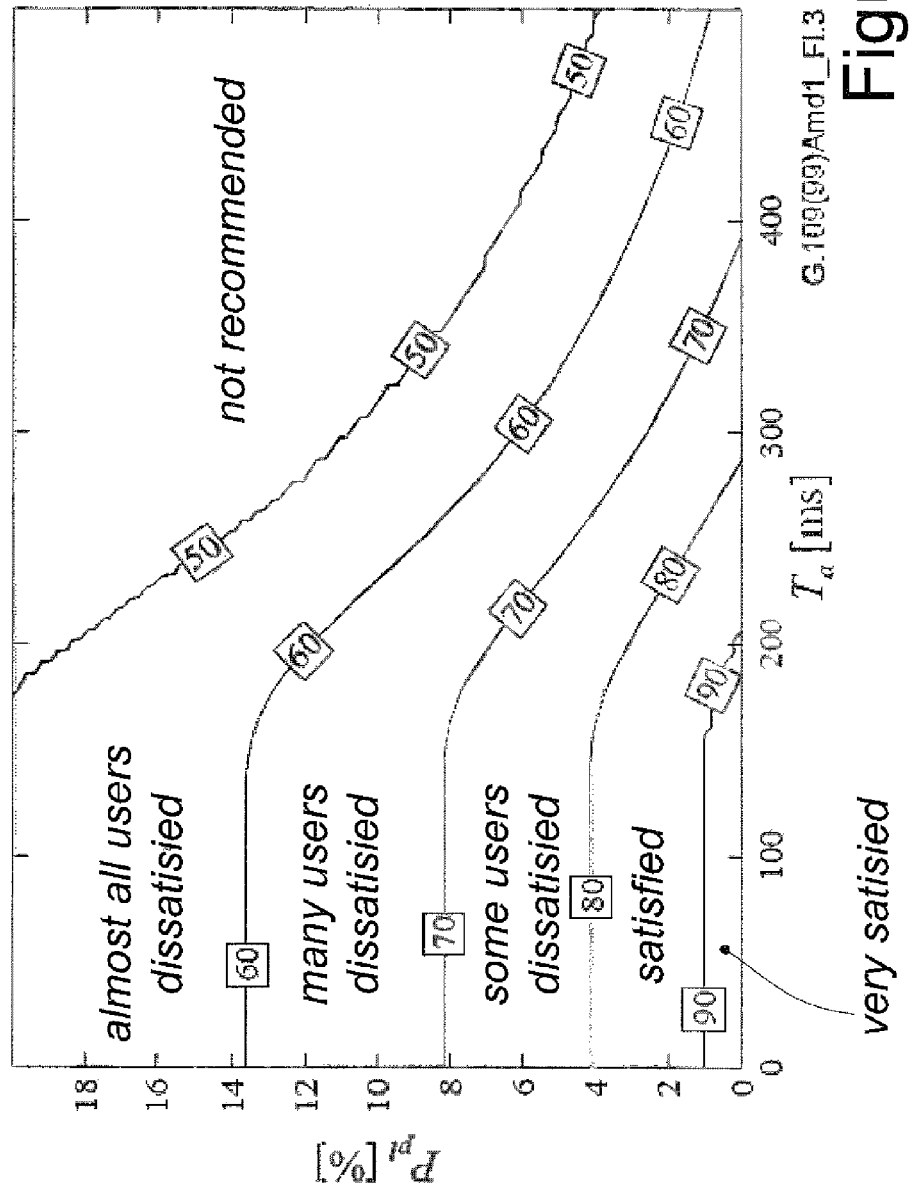
FIG. 6 is a graph illustrating contours of rating factor R and corresponding user satisfaction

By placing $T^a$ on the X-axis and $P_{pl}$ on the Y-axis it is possible to draw values of R for all possible combinations of loss and delay as shown in FIG. 6. ITU-T G.109 defines categories of speech transmission quality and categories of user satisfaction in terms of ranges of R. Consequently, it is possible to draw contours of speech transmission quality to be expected by end user (contours of user satisfaction), these are shown in italic text in FIG. 6.

Quality contours are determined by the Delay Impairment $I_{dd}$ that covers loss of interactivity and the Effective Equipment Impairment $I_{e\text{-}eff}$ that covers information loss due to encoding scheme and packet loss. Quality contours determine the rating factor R for all possible combinations of packet loss (assuming a given encoding scheme) and mouth-to-ear delay (assuming echo-free connections).

Pictorial representation of playout delays and resulting packet loss on quality contours gives a more detailed view of a given playout mechanism's performance [2]. To demonstrate the effectiveness of the method of the present application, experimental comparisons have been performed with prior art playout buffer algorithms, namely the Ramjee[3] and Moon[7] algorithms. The experimental results show that the present quality driven buffer adaptation algorithm provides the highest R score (or equivalently MOS). The improvement in quality is comparable with that between mobile and landline telephony.

The first result shown in FIG. 7 represents results obtained using the prior art Ramjee Algorithm (which resulted in a MOS=3.9) and FIG. 8 shows results obtained using the prior art Moon Algorithm (MOS=3.9).

In contrast, the algorithm of the present application, the results of which are shown in FIG. 9 resulted in a significantly higher MOS score of 4.3.

Thus it will be appreciated that the present method offers a significant advantage over the prior art. In particular, it will be understood that the conventional approaches to optimizing playout delays are designed to minimize loss/delay trade off from a statistical point of view and not from end-use perspective. As such they seek to keep both buffering delay and packet loss low rather than find the optimal operating point on the loss/delay trade off that maximizes end-user satisfaction Moreover, it will be appreciate that the embodiments described herein are not to be considered limiting and that a variety of alterations and replacement of features with equivalents is possible without departing from the spirit or scope of the present invention.

REFERENCES

[1] ITU-T Recommendation G.1020, "Performance parameter definitions for quality of speech and other voiceband applications utilising IP networks", November 2003

[2] ITU-T Recommendation G.109 Appendix I (01/2007), "The E-model based quality contours for predicting speech transmission quality and user satisfaction from time-varying transmission impairments", Geneva, January 2007

[3] R. Ramjee, J. Kurose, D. Towsley, and H. Schulzrinne, "Adaptive playout to mechanisms for packetized audio applications in wide-area networks", Proceedings of the IEEE Infocom, June 1994

[1] J. C. Bolot and A. Vega-Garcia, "Control mechanisms for packet audio in the Internet", Proceedings of the IEEE Infocom 1996, April '96;

[5] M. Narbutt, L. Murphy, "VoIP Playout Buffer Adjustment using Adaptive Estimation of Network Delays", Proceedings of the 18-th International Teletraffic Congress—ITC-18, p. 1171-1180, September 2003

[6] N. Shivakumar, C. J. Sreenan, B. Narendran, and P. Agrawal, "The Concord algorithm for synchronization of networked multimedia streams", Proceedings of the IEEE International Conference on Multimedia Computing and Systems, May 1995

[7] S. B. Moon, J. Kurose, and D. Towsley, "Packet audio playout delay adjustment: Performance bounds and algorithms", ACM/Springer Multimedia Systems, Vol. 6, January 1998

[8] D. L. Stone, K. Jeffay, "An empirical study of delay jitter management policies", ACM/Springer Multimedia Systems Journal, Vol. 2, No. 6, January, '95

[9] M. Narbutt, M. Davis "Assessing the Quality of VoIP Transmission Affected by Playout Buffer Scheme", Proc. of the ETSI/IEEE Measurement of Speech and Audio Quality in Networks Conference 2005 (MESAQIN 2005), Prague, June 2005.

[10] M. Narbutt, A. Kelly, L. Murphy, P. Perry, "Adaptive VoIP Playout scheduling: Assessing User Satisfaction", IEEE Internet Computing Magazine, vol. 09, No. 4, July/August 2005

[11] IETF Network Time Protocol (NTP) http://www.ietf.org/dyn/wg/charter/ntp-charter.html

[12] HTTP Time Protocol (HTP) http://www.clevervest.com/twiki/bin/view/HTP

[13] H. Schulzrinne at al. RFC 5506 "RTP: A Transport Protocol for Real-Time Applications" http://tools.ietf.org/html/rfc3550

[14] ITU-T Recommendation G.107 (04/2009), "The E-Model, a computational model for use in transmission planning"

[15] ITU-T Recommendation G.113 (11/2007),"Transmission impairments due to speech processing"

[16] ITU-T Recommendation G.113 Amendment 1 (03/2009), "Revised Appendix IV—Provisional planning values for the wideband equipment impairment factor and the wideband packet loss robustness factor"

[17] Hugh Melivin, Liam Murphy "An integrated NTP-RTCP solution to audio skew detection and compensation for VoIP applications", ICME '03 Proc. of the International Conference on Multimedia and Expo, Baltimore, USA, July 2003

The invention claimed is:

1. A method of operating a Voice over Internet Protocol (VoIP) device having a de-jitter buffer during a VoIP call, the method comprising the steps of:
   a) determining a plurality of end to end delays of a plurality of received VoIP packets during a window at the VoIP device from a transmitter across a network, each of the plurality of the received VoIP packets containing an audio payload and an absolute timestamp, wherein the absolute timestamp has been synchronized with a universal clock, and further wherein each of the plurality of the end to end delays are determined by extracting a value of the absolute timestamp contained after a Synchronization Source (SSRC) identifier within a corresponding VoIP packet of the plurality of the received VoIP packets, and comparing the extracted value of the absolute timestamp with a local clock synchronized to the universal clock to determine an absolute time delay for each of the corresponding VoIP packet; and
   b) determining an optimal operating point from a plurality of different operating points for the de-jitter buffer using the determined absolute time delays to maximize a transmission quality factor R, wherein the plurality of different operating points are different playout deadlines for the de-jitter buffer.

2. A method according to claim 1, wherein the optimal operating point of the de-jitter buffer is determined from predetermined quality curves in which regions of different user satisfaction are identified and the method seeks to maintain the optimal operating point in a region of maximum possible user satisfaction for current conditions.

3. A method according to claim 1, wherein the value of the absolute timestamp is selectively extracted from a group comprising:
   a) at least one Contributing Source (CSRC) field of a header of the received VoIP packet, and
   b) a field following a CSRC list.

4. A method according to claim 1, wherein the value of the absolute timestamp is extracted from two CSRC fields of the received VoIP packet.

5. A method according to claim 1, wherein the value of the absolute timestamp is in Network Time Protocol (NTP) format.

6. A Voice over Internet Protocol (VoIP) device for receiving VoIP packet data during a VoIP call and providing an audio signal to a user from said received VoIP data, the VoIP device comprising a de-jitter buffer having a variable buffering delay, and a local clock synchronized to a universal clock, wherein the device is configured to determine an absolute end to end delay of each VoIP packet received during a window at the VoIP device by extracting a value of an absolute timestamp contained after a Synchronization Source (SSRC) identifier of the corresponding VoIP packet headers of the plurality of the received VoIP packets and comparing the value of the absolute timestamp with the local clock and wherein the VoIP device is further configured to determine an optimal operating point from a plurality of different operating points for the de-jitter buffer using the determined absolute time delays to maximize a transmission quality factor R, wherein the plurality of different operating points are different playout deadlines for the de-jitter buffer.

7. A VoIP device according to claim 6, wherein the device is adapted to determine the optimal buffering delay from predetermined quality curves in which regions of different user satisfaction are identified by seeking to maintain the optimal operating point in a region of maximum possible user satisfaction.

8. A VoIP device according to claim 6, wherein the value of the absolute timestamp is selectively extracted from:
   a) at least one Contributing Source (CSRC) field of a header of the received VoIP packet, and, alternatively
   b) a field following a CSRC list.

9. A VoIP device according to claim 6, wherein the value of the absolute timestamp is extracted from two CSRC fields of the received VoIP packet.

10. A VoIP device according to claim 6, further comprising GPS means for synchronizing to a universal clock, suitably a Global Positioning System (GPS) receiver.

11. A VoIP device according to claim 6 wherein the value of the timestamp is in Network Time Protocol (NTP) format.

12. A method for operating a Voice over Internet Protocol (VoIP) device having a de-jitter buffer which comprises the steps of:
   establishing a window for the VoIP device, wherein the VoIP device operates with a continuing sequence of a plurality of windows during a VoIP call;
   using a predetermined playout deadline for the de-jitter buffer during the window; measuring an absolute time delay for a plurality of VoIP packets received into the de-jitter buffer during the window;
   comparing the absolute time delay of the packets from the measuring step with a test playout deadline in a plurality of playout deadlines to determine a packet loss and a quality metric for each test playout deadline, wherein each quality metric is based on its corresponding packet loss;
   selecting a test playout deadline in a plurality of playout deadlines from the comparing step based on the highest respective quality metric;
   using the test playout deadline selected in the selecting step as the predetermined playout deadline for a subsequent window of the VoIP call; and
   determining an optimal operating point from a plurality of different operating points for the de-jitter buffer using the determined absolute time delays to maximize a transmission quality factor R, wherein the plurality of different operating points are different playout deadlines for the de-jitter buffer.

* * * * *